United States Patent
Gao et al.

(10) Patent No.: US 9,832,662 B2
(45) Date of Patent: Nov. 28, 2017

(54) METHOD AND DEVICE FOR DETERMINING RADIO LINK FAILURE REASON

(75) Inventors: Yin Gao, Shenzhen (CN); Lifeng Han, Shenzhen (CN)

(73) Assignee: XI'AN ZTE NEW SOFTWARE COMPANY LIMITED, Xi'an (CN)

( * ) Notice: Subject to any disclaimer, the term of this patent is extended or adjusted under 35 U.S.C. 154(b) by 0 days.

(21) Appl. No.: 13/879,541

(22) PCT Filed: Apr. 1, 2011

(86) PCT No.: PCT/CN2011/072392
§ 371 (c)(1),
(2), (4) Date: Jul. 2, 2013

(87) PCT Pub. No.: WO2012/048559
PCT Pub. Date: Apr. 19, 2012

(65) Prior Publication Data
US 2013/0288665 A1 Oct. 31, 2013

(30) Foreign Application Priority Data
Oct. 14, 2010 (CN) .......................... 2010 1 0507079

(51) Int. Cl.
*H04W 36/00* (2009.01)
*H04W 24/02* (2009.01)
(Continued)

(52) U.S. Cl.
CPC ......... *H04W 24/02* (2013.01); *H04W 76/028* (2013.01); *H04W 24/10* (2013.01)

(58) Field of Classification Search
CPC ............. H04W 36/00; H04W 36/0083; H04W 36/0097; H04W 36/08; H04W 36/36;
(Continued)

(56) References Cited

U.S. PATENT DOCUMENTS

2006/0246888 A1* 11/2006 Bender et al. ................ 455/423
2008/0032727 A1* 2/2008 Stephenson et al. ......... 455/513
(Continued)

FOREIGN PATENT DOCUMENTS

CN 101808354 A 8/2010
CN 101836478 A 9/2010
(Continued)

OTHER PUBLICATIONS

International Search Report for corresponding application PCT/CN2011/072392 filed Apr. 1, 2011; Mail date Jul. 14, 2011.
(Continued)

*Primary Examiner* — Joshua Schwartz
(74) *Attorney, Agent, or Firm* — Cantor Colburn LLP (57) ABSTRACT

The disclosure claims a method and a device for determining a Radio Link Failure (RLF) reason, wherein a UE has an RLF in a first eNB where the UE is located, and successfully establishes a RRC with a second eNB. The method includes that: the UE sends RLF information to the first eNB, wherein the RLF information includes at least one of the following: the ambient signal quality information recorded by the UE when the RRC is established successfully, the location information of the UE when the RLF occurs, and the location information of the UE when the RRC is successfully established; the first eNB determines the RLF reason according to the RLF information. The disclosure solves the problem that the RLF reason cannot be judged accurately in the conventional art, and enables the network side to obtain more accurate and comprehensive information.

6 Claims, 3 Drawing Sheets (51) Int. Cl.
*H04W 76/02* (2009.01)
*H04W 24/10* (2009.01)

(58) Field of Classification Search
CPC ..... H04W 36/30; H04W 36/38; H04W 36/16; H04W 36/24
USPC .................................................. 455/436–444
See application file for complete search history.

(56) References Cited

U.S. PATENT DOCUMENTS

| | | | |
|---|---|---|---|
| 2008/0261600 A1* | 10/2008 | Somasundaram et al. ... | 455/436 |
| 2009/0042596 A1* | 2/2009 | Yavuz et al. .................. | 455/522 |
| 2009/0257373 A1* | 10/2009 | Bejerano ...................... | 370/328 |
| 2010/0173633 A1* | 7/2010 | Catovic et al. ............... | 455/436 |
| 2010/0234027 A1 | 9/2010 | Han et al. | |
| 2011/0212720 A1* | 9/2011 | Hamalainen et al. ........ | 455/423 |

FOREIGN PATENT DOCUMENTS

| | | |
|---|---|---|
| JP | 2012518923 A | 8/2012 |
| WO | 2009060935 A1 | 5/2009 |
| WO | 2009096883 A1 | 8/2009 |
| WO | 2010094236 A1 | 8/2010 |

OTHER PUBLICATIONS

Nokia Siemens Networks, "UE-orginated RLF reports for coverage hole detection", 3GPP TSG RAN WG3 Meeting #65, Aug. 24-28, 2009, Shenzhen, China, 2 pages.
International Search Report for corresponding Japanese application 2013533073 filed Aug. 22, 2013.
Huawei, "UE RLF report for Mobility Robustness Optimisation", 3GPP Draft R3-100899, Feb. 12, 2010 (Feb. 12, 2010), 6 pages.
Huawei, "UE RLF Report", 3GPP Draft; R2-101265 UE RLF Report, 3rd Generation Partnership Project (3GPP) Mobile Competence Centre; 650, Route Des Lucioles; F-06921 Sophia-Antipolis Cedes; France, 3 pages.

* cited by examiner

METHOD AND DEVICE FOR DETERMINING RADIO LINK FAILURE REASON

FIELD OF THE INVENTION

The disclosure relates to the field of wireless mobile communication, and in particular to a method and device for determining a Radio Link Failure (RLF) reason.

BACKGROUND OF THE INVENTION

The Long Term Evolution (LTE) network consists of the Evolved Universal Mobile Telecommunication System (UMTS) Terrestrial Radio Access Network (E-UTRAN) Evolved Node B (eNB) and the Evolved Packet Core (EPC). The network is flattened. The EUTRAN includes a collection of eNBs which are connected with the EPC via the S1 interface. The eNBs can be connected with each other via the X2 interface. The S1 and X2 interfaces are logical interfaces. One EPC can manage one or multiple eNBs. One eNB also can be controlled by multiple EPCs, and one eNB can manage one or multiple cells. The EPC consists of the Mobility Management Entity (MME), the Serving Gateway (SGW) and the Packet Data Network Gateway (PGW).

Figure 1:
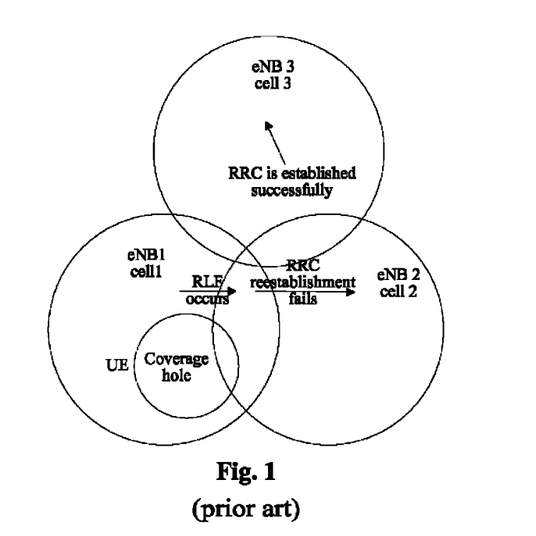
FIG. 1 shows a diagram of terminal movement caused by the coverage according to related techniques.

In the LTE, due to the factors such as the wireless environment, or the movement of a User Equipment (UE) in the network coverage areas etc., exceptions may occur to the connection of UE. For example, it may cause RLF to the UE, thus affecting the normal service of the UE. The RLF reason needs to be detected as soon as possible in order to avoid such situation. For example, whether any coverage holes exist in the coverage area needs to be detected. However, the improper switching parameters in the LTE network also may cause the UE to have an RLF. For example, a serving cell may switch the UE to a neighbor cell which has weak signal, so that RLF occurs to the UE in the neighbor cell. In order to optimize such situation, the Mobility Robustness Optimization (MRO) is proposed in the Self-Organizing Network (SON) function of the LTE. The MRO can find the problems of the current mobility parameters according to the behavior that RLF occurs to the UE. For example, as shown in FIG. 1, RLF occurs to the UE which locates in cell 1 (eNB1). And finally, the UE selects a cell 2 (eNB2) to initiate reestablishment. Cell 2 (eNB2) can immediately send an RLF Indication (RLF INDICATION) to cell 1 (eNB1) according to a reestablishment message of the UE. If the reestablishment of the UE fails in cell 2, and the UE returns to an IDLE state, the UE can select a new cell 3 to implement a Radio Resource Connection (RRC) establishment via cell selection. However, while the UE is in the IDLE state, the UE may pass through multiple cells. From the time when RLF occurs to the UE to the process that the RRC is established, the information collected by the UE is very important for the network side to detect whether it is the problem of coverage or the problem of mobility parameters.

However, as mentioned above, as the coverage hole may cause the UE to have the RLF, it may cause that the network side cannot accurately judge the RLF reason. For example, the time from the time point that the UE returns to the IDLE state due to unsuccessful RRC establishment to the time point that the UE selects a proper cell to implement successful RRC establishment via the cell selection can be very long or very short. And, this is relative to the movement track of the UE and the size of the coverage holes. However, the current information reported by the UE only include the measurement result at the time when RLF occurs to the UE, which can only be used to judge whether the RLF is caused by the coverage. Thereby, the RLF reason cannot be accurately judged.

SUMMARY OF THE INVENTION

The disclosure is provided aiming at the problem that the RLF reason cannot be accurately judged in the conventional art. For this reason, the main purpose of the disclosure is to provide a method and device for determining the RLF reason, so as to solve at least one of the problems.

In order to achieve the purposes, according to one aspect of the disclosure, a method for determining an RLF reason is provided, wherein an RLF occurs to a UE located in a first eNB, the UE successfully establishes an RRC with a second eNB, and the method comprises: the UE sending RLF information to the first eNB, wherein the RLF information comprises at least one of: ambient signal quality information recorded by the UE when the RRC is established successfully, location information of the UE when the RLF occurs, and location information of the UE when the RRC is successfully established; and the first eNB determining the RLF reason according to the RLF information.

The UE sending the RLF information to the first eNB comprises: the UE reporting the RLF information to the second eNB; and the second eNB sending the RLF information to the first eNB via an X2 interface or an S1 interface.

The UE sending the RLF information to the first eNB comprises: the UE reporting the RLF information to the second eNB; the second eNB sending the RLF information to a core network via an X2 interface or an S1 interface; and the core network sending the RLF information to the first eNB.

The first eNB determining the RLF reason according to the RLF information comprises: the first eNB judging whether signal quality of a cell, which is recorded when the RLF occurs and is carried in the RLF information, is less than a preset threshold, wherein the cell comprises at least one of: a serving cell where the UE is located and neighbor cells; and if yes, the first eNB determining that the RLF reason is that a coverage hole exists in the cell.

The first eNB judging whether the signal quality of the serving cell or the neighbor cells, which is recorded when the RLF occurs and is carried in the RLF information, is less than the preset threshold further comprises: determining that the RLF reason is that the coverage hole exists in the cell, if the cell of which the signal quality is less than the preset threshold exists; and calculating size and location of the coverage hole in the cell of which the signal quality is less than the preset threshold, according to a cell coverage model, a signal attenuation model, the location information of the UE when the RLF occurs, and the location information of the UE when the RRC is established successfully.

After determining that the RLF reason is that the coverage hole exists in the cell, the method further comprises: adjusting parameters which are used for affecting cell coverage in the cell which has the coverage hole.

The ambient signal quality information comprises at least one of: service signal quality of a serving cell and neighbor cells which is measured when the UE initiates an RRC request to the second eNB.

The first eNB and the second eNB are located in different systems.

In order to achieve the purpose, according to another aspect of the disclosure, a device for determining an RLF reason is provided. The device is provided in a first eNB, wherein an RLF occurs to a UE located in the first eNB, and the UE successfully establishes an RRC with a second eNB, and the device comprises: a receiving unit, configured to receive RLF information from the UE, wherein the RLF information comprises at least one of: ambient signal quality information recorded by the UE when the RRC is established successfully, location information of the UE when the RLF occurs, and location information of the UE when the RRC is established successfully; and a determining unit, configured to determine the RLF reason according to the RLF information.

The receiving unit comprises: a first receiving module, configured to receive the RLF information which is sent by the UE and is forwarded by the second eNB; and a second receiving module, configured to receive the RLF information which is sent by the UE and is forwarded by the second eNB and a core network.

The determining unit comprises: a judging module, configured to judge whether signal quality of a cell, which is recorded when the RLF occurs and is carried in the RLF information, is less than a preset threshold, wherein the cell comprises at least one of: a serving cell where the UE is located and neighbor cells; and a determining module, configured to determine that the RLF reason is that a coverage hole exists in the cell, if the signal quality of the cell, which is recorded when the RLF occurs and is carried in the RLF information, is less than the preset threshold.

The device further comprises: an adjusting unit, configured to adjust parameters which are used for affecting cell coverage in the cell which has the coverage hole, after it is determined that the RLF reason is that the coverage hole exists in the cell.

With the disclosure, the RLF reason can be judged by using the ambient signal quality information and the location information, so that the network side is enabled to obtain more accurate and comprehensive information. In addition, the disclosure also analyzes the RLF problem caused by the coverage, estimates the size of the coverage hole, and provides a detection method for solving the network coverage problem. Further, this solution is beneficial for the network side to implement corresponding optimization measures according to the coverage situations, and thus reduces the network call drop rate, and improves the network performance.

The other features and advantages of the disclosure are described hereinafter. In addition, a part of features and advantages becomes obvious in the specifications, or can be understood by implementing the disclosure. The purposes and other advantages of the disclosure can be implemented and obtained via the structures particularly pointed out in the written specifications, claims and drawings.

BRIEF DESCRIPTION OF THE DRAWINGS

The drawings described herein are used for further understanding the disclosure, and form a part of the application. The schematic embodiments and the descriptions of the disclosure are used for explaining the disclosure, without improperly limiting the disclosure. In the drawings.

DETAILED DESCRIPTION OF THE EMBODIMENTS

The disclosure is described below with reference to the drawings and embodiments in detail. It should note that the embodiments of the application and the features of the embodiments can be combined with each other under the condition of no conflict.

Embodiment 1

Figure 2:
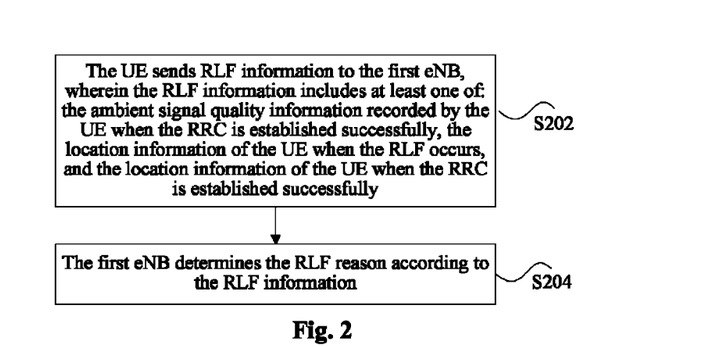
FIG. 2 shows a preferred flowchart of a method for determining an RLF reason according to an embodiment of the disclosure.

FIG. 2 shows a preferred flowchart of a method for determining an RLF reason according to an embodiment of the disclosure. In this embodiment, the UE has an RLF in a first eNB where the UE is located, and successfully establishes RRC with a second eNB. The determining method as shown in FIG. 2 includes the following steps.

S202, the UE sends RLF information to the first eNB, wherein the RLF information includes at least one of the following: the ambient signal quality information recorded by the UE when the RRC is established successfully, the location information of the UE when the RLF occurs, and the location information of the UE when the RRC is successfully established;

S204, the first eNB determines the RLF reason according to the RLF information.

Via the preferred embodiment, the RLF reason can be judged by using the ambient signal quality information and the location information, so as to enable the network side to obtain more accurate and comprehensive information.

Preferably, the step that the UE sends the RLF information to the first eNB includes that: the UE reports the RLF information to the second eNB; and the second eNB sends the RLF information to the first eNB via an X2 or S1 interface. In this preferred embodiment, the RLF information is transferred to a source eNB, so that the source eNB can judge the situation of the coverage holes when the RLF occurs previously according to the carried information.

Preferably, the step that the UE sends the RLF information to the first eNB includes that: the UE reports the RLF information to the second eNB; the second eNB sends the RLF information to a core network via the X2 or S1 interface; and the core network sends the RLF information to the first eNB. The disclosure can be applied to different scenes via this preferred embodiment.

Preferably, the step that the first eNB determines the RLF reason according to the RLF information includes that: the first eNB determines that the RLF reason is that a coverage hole exists in the cell according to the RLF information. Specifically, the first eNB (namely, the source eNB) judges whether the signal quality of the cell, which is recorded when the RLF occurs and is carried in the RLF information, is less than a preset threshold, wherein the cell includes at least one of: a serving cell where the UE is located and neighbor cells. If yes, it can be determined that the RLF reason is that a coverage hole exists in the cell.

Preferably, the step that the first eNB determines the RLF reason according to the RLF information includes that: the first eNB determines the cell which has the coverage hole, and determines the size and location of the coverage hole, according to the RLF information. Specifically, if the cell of which the signal quality is less than the preset threshold exists, it can be determined that the RLF reason is that the cell has the coverage hole. The size and location of the coverage hole in the cell of which the signal quality is less than the preset threshold can be calculated via the cell coverage model, the signal attenuation model, the location information of the UE when the RLF occurs, and the location information of the UE when the RRC is established successfully.

For example, the information carried in the RLF information includes: 1) the ambient signal quality information recorded when the RLF occurs to the UE under the scene as shown in FIG. 1, including the signal quality of the current serving cell 1, the signal quality of cell 2, and the signal quality information of cell 3; 2) the location information recorded when RLF occurs to the UE; 3) the ambient signal quality information recorded when the UE establishes the RRC in cell 3, including the signal quality of the current serving cell 3, the signal quality of cell 1, and the signal quality information of cell 3; and 4) the location information of the UE recorded when the RRC is established successfully. The distance between two points can be approximately estimated by calculating the distance between the information in two different locations. Also, according to the signal quality difference among cell 1, cell 2 and cell 3, for example, all the signal quality of cell 1 is very low, it can be judged that the coverage of cell 1 is abnormal. Further, within the coverage range of cell 1, the signal attenuation value of each point can be calculated via the location information of the UE when the RLF occurs, the location information of the UE when the RRC is established successfully and the coverage model of the cell. If the signal attenuation value of one point is obviously less than the signal attenuation value evaluated by the signal attenuation model (for example, being less than the value calculated by using the signal attenuation value evaluated by the signal attenuation model to subtract the preset threshold), it can be judged that the cell coverage on this point is abnormal. The size and location of the coverage hole in the cell which has the coverage hole can be approximately estimated via the method.

Preferably, after the first eNB determines the cell which has the coverage hole and determines the size of the coverage hole according to the RLF information, the method further includes: adjusting the parameters which are used for affecting the cell coverage in the cell which has coverage hole. Specifically, the optimization parameters are generated according to the determined cell which has the coverage hole and the size and location of the coverage hole. The parameters which are used for affecting the cell coverage in the cell which has the coverage hole are adjusted by using the optimization parameters. For example, after the source eNB determines the cell which has the coverage problem, the network optimization can be achieved by adjusting the parameters which affect the cell coverage, such as the transmitting power, antenna tilt and the like of the cell which has the coverage problem.

Preferably, the ambient signal quality information includes at least one of: the service signal quality of the serving cell and the neighbor cells measured when the UE initiates the RRC request to the second eNB.

Preferably, the above location information can be represented by longitude, latitude, elevation and the like.

Preferably, the first eNB and the second eNB are located in different systems. That is, if the UE establishes the RRC connection in a different system, such as the UTRAN or the Global System for Mobile communications (GSM), the determining methods mentioned in each embodiment of the disclosure can also be applied.

Preferably, the information reported by the UE also can be transferred among the eNBs via the interface, such as the X2 interface or the S1 interface in the LTE system.

In the preferred embodiment of the disclosure, the RLF-related information is reported by terminal. The network side can use the information to judge the coverage problem which causes the RLF after obtaining the RLF-related information, and can estimate the size and location of the coverage holes via the time and related information of the ambient signal quality measured by the UE. Thus, this solution provides more basis for detection and location of the coverage holes.

Embodiment 2 the flow that the terminal reports the RLF-related information is described with reference to FIG. 3.

Figure 3:
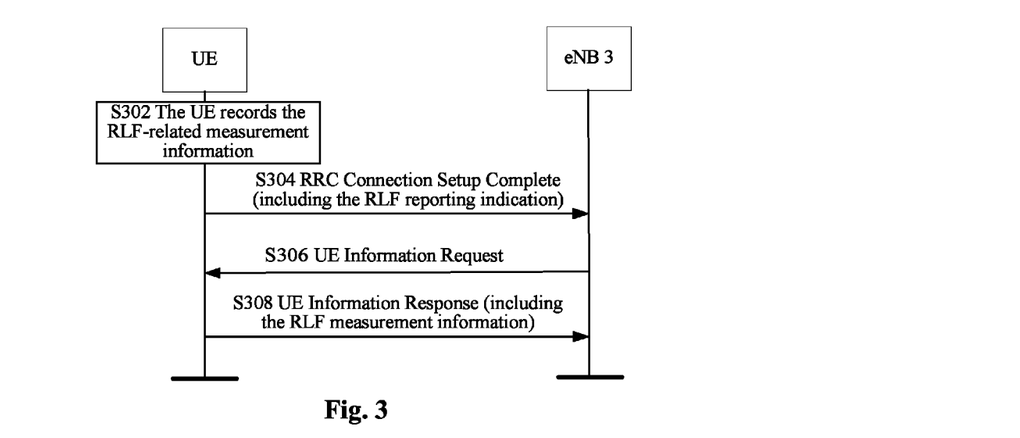
FIG. 3 shows another preferred flowchart of a method for determining an RLF reason according to an embodiment of the disclosure.

As shown in FIG. 3, the flow that the terminal reports the RLF-related information includes the following steps.

S302, the UE is located in cell 1 which is administrated by eNB 1, and the RLF is caused due to worse wireless quality or other reasons. The UE selects to implement the RRC reestablishment process in cell 2 which is administrated by eNB 2 according to the cell selection process, and the reestablishment fails. The UE turns to the IDLE state. The UE implements successful RRC connection in cell 3 of eNB 3 via the cell selection during the movement process. And in the process, in addition to recording the signal quality measurement result of the serving cell and the surrounding neighbor cells measured before the RLF occurs, the UE can also record the signal quality measurement result of the serving cell and the surrounding neighbor cells measured when the UE initiates the RRC connection. Also, the location information at the time when RLF occurs to the UE, and/or the location information at the time when the UE initiates successful RRC establishment can be included. The location information can be represented by longitude, latitude, elevation and the like.

S304, the UE carries the indication information of the RLF-related measurement information in the RRC Connection Setup Complete message, indicating to eNB 3 that the UE has stored RLF-related measurement information to be reported. The RLF-related measurement information refers to one or more of: the signal quality measurement result of the serving cell and the surrounding neighbor cells measured before the RLF occurs, the signal quality measurement result of the serving cell and the surrounding cells measured when the UE initiates the RRC connection subsequently, the location information of the UE when the RLF occurs, and the location information of the UE when the RRC is established successfully.

S306, after receiving the indication information of the RLF-related measurement information, eNB 3 can send the UE Information Request message to the UE, thus enabling the UE to report the RLF-related measurement information.

S308, the UE can report the RLF-related measurement information to eNB 3 via the UE Information Response message. The eNB 3 can send the RLF-related measurement information to eNB 1 via the message of the X2 or S1. Preferably, the message that can be used includes the RLF INDICATION message and the like.

The eNB 1 receives the RLF-related measurement information, and combines with other RLF information to judge whether the RLF is caused by the coverage black holes or by unreasonable setting of the switching parameters. For example, if the signal quality of the serving cell and the surrounding cells is relatively weak, coverage holes may exist here. And, according to the signal quality measurement result of the serving cell and the surrounding neighbor cells recorded before the RLF occurs, the signal quality measurement result of the serving cell and the surrounding cells measured when the UE initiates the RRC connection subsequently, and the location information of the two moments recorded by the UE, and by combining the distribution information of the cells on the locations in the network topology information stored in the network management system database, it can be estimated that the network coverage problem is caused by the coverage of which cell, and the size of the coverage hole. Thus, the solution implements reasonable parameter optimization, and improves the system performance.

Embodiment 3 the flow of transferring and processing the reported RLF information among the eNBs is described with reference to FIG. 4.

Figure 4:
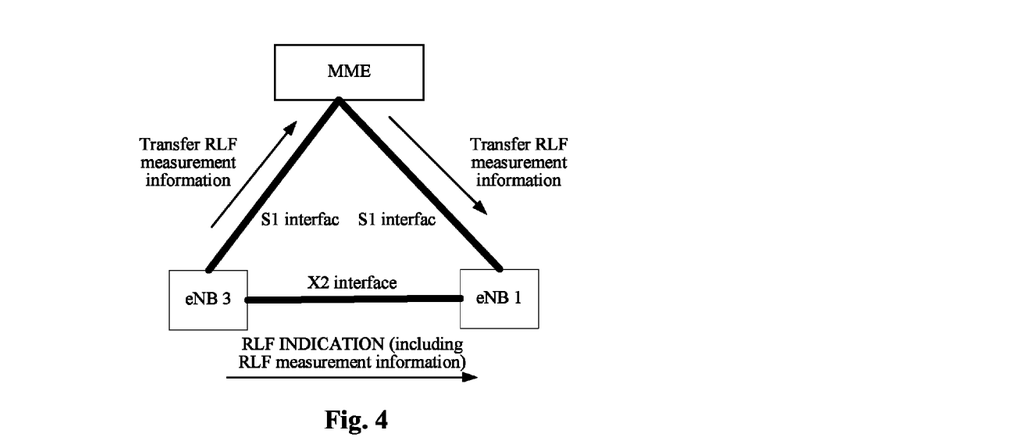
FIG. 4 shows another preferred flowchart of a method for determining an RLF reason according to an embodiment of the disclosure.

As shown in FIG. 4, the flow of transferring and processing the reported RLF information among the eNBs includes the following steps.

1) As the scene in embodiment 1, when eNB 3 receives the RLF-related measurement information reported by the UE, if there is a direct interface between eNB 3 and eNB 1, Step 2) is executed. If there is no direct interface between eNB 3 and eNB 1, Step 3) is executed.

2) The eNB 3 sends the RLF-related measurement information to eNB 1 in the RLF INDICATION message by the X2 interface, and eNB 1 implements local processing. Then, Step 5) is executed.

3) The eNB 3 transmits the RLF-related measurement information to the core network via the S1 interface. The information contains the route information of Cell 1 administrated by eNB 1, such as the global Identification (ID) information of TAC and eNB 1.

4) The core network transparently transmits the RLF-related measurement information to eNB 1, and eNB 1 implements local processing.

5) The eNB 1 receives the RLF-related measurement information, and combines with other RLF information to judge whether the RLF is caused by the coverage black holes or by unreasonably setting of switching parameters. For example, if the signal quality of the serving cell and the surrounding cells is relatively weak, the coverage holes may exist here. And, according to the signal quality measurement result of the serving cell and the surrounding neighbor cells recorded before the RLF occurs, the signal quality measurement result of the serving cell and the surrounding cells measured when the UE initiates the RRC connection subsequently, and the location information of the two moments recorded by the UE, and by combining the distribution information of the cells on the locations in the network topology information stored in the network management system database, it can be estimated that the network coverage problem is caused by the coverage of which cell, and the size of the coverage hole. Thus, this solution implements reasonable parameter optimization, and improves the system performance.

Embodiment 4

Figure 5:
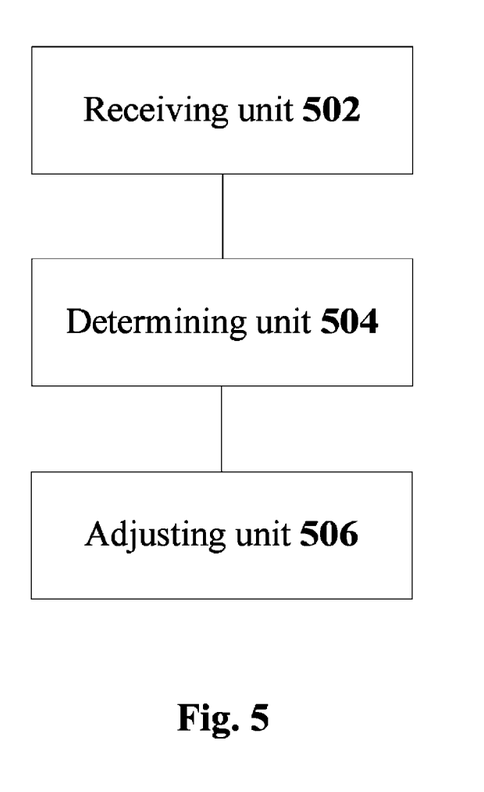
FIG. 5 shows a preferred structural diagram of a device for determining an RLF reason according to an embodiment of the disclosure.

FIG. 5 shows a preferred structural diagram of a device for determining an RLF reason according to the embodiment of the disclosure. As shown in FIG. 5, the device for determining the RLF reason in this embodiment is located in the first eNB, wherein an RLF occurs to a UE located in the first eNB, and the UE successfully establishes the RRC with the second eNB. Specifically, the determining device includes: a receiving unit 502, configured to receive the RLF information from the UE, wherein the RLF information includes at least one of the following: the ambient signal quality information recorded by the UE when the RRC is established successfully, the location information of the UE when the RLF occurs, and the location information of the UE when the RRC is established successfully; and a determining unit 504, which is connected with the receiving unit 502, and is configured to determine the RLF reason according to the RLF information.

Via the preferred embodiment, the RLF reason can be judged by using the ambient signal quality information and the location information, thus enabling the network side to obtain more accurate and comprehensive information. In addition, the disclosure also analyzes the RLF problem caused by the coverage, estimates the size of the coverage holes, and provides detection methods for solving the network coverage problems. Further, this solution is beneficial for the network side to implement corresponding optimization measures according to the coverage situations, reduces the network call drop rate, and improves the network performance.

Preferably, the receiving unit 502 includes: a first receiving module, configured to receive the RLF information which is sent by the UE and is forwarded by the second eNB; and a second receiving module, configured to receive the RLF information which is sent by the UE, and is forwarded by the second eNB and the core network. Via this preferred embodiment, the disclosure can be suitable for various scenes.

Preferably, the determining unit 504 includes: a judging module, configured to judge whether the signal quality of the cell, which is recorded when the RLF occurs and is carried in the RLF information, is less than the preset threshold, wherein the cell includes at least one of: the serving cell where the UE is located and neighbor cells; and a determining module, which is connected with the judging module, and is configured to determine that the RLF reason is that a coverage hole exists in the cell when the signal quality of the cell, which is recorded when the RLF occurs and is carried in the RLF information, is less than the preset threshold.

Preferably, the step that the determining unit 504 determines the RLF reason according to the RLF information further includes that: the determining unit 504 determines the cell which has the coverage holes and the size and location of the coverage holes according to the RLF information. Specifically, if the cell of which the signal quality is less than the preset threshold exists, it can be determined that the RLF is caused by that the cell has the coverage holes. Then, the size and location of the coverage holes in the cell of which the signal quality is less than the preset threshold can be calculated via the cell coverage model, the signal attenuation model, the location information of the UE when the RLF occurs, and the location information of the UE when the RRC is established successfully.

For example, the information carried in the RLF information includes: 1) the ambient signal quality information recorded when the RLF occurs to the UE under the scene as shown in FIG. 1, including the signal quality of the current serving cell 1, the signal quality of cell 2, and the signal quality information of cell 3; 2) the location information recorded when RLF occurs to the UE; 3) the ambient signal quality information recorded when the UE establishes the RRC in cell 3, including the signal quality of the current serving cell 3, the signal quality of cell 1, and the signal quality information of cell 3; and 4) the location information of the UE recorded when the RRC is established successfully. The distance between two points can be approximately estimated by calculating the distance between the information in two different locations. Also, according to the signal quality difference among cell 1, cell 2 and cell 3, for example, all the signal quality of cell 1 is very low, it can be judged that the coverage of cell 1 is abnormal. Further, within the coverage range of cell 1, the signal attenuation value of each point can be calculated via the location information of the UE when the RLF occurs, the location information of the UE when the RRC is established successfully and the coverage model of the cell. If the signal attenuation value of one point is obviously less than the signal attenuation value evaluated by the signal attenuation model (for example, being less than the value calculated by using the signal attenuation value evaluated by the signal attenuation model to subtract the preset threshold), it can be judged that the cell coverage on this point is abnormal. The size and location of the coverage hole in the cell which has the coverage hole can be approximately estimated via the method.

Preferably, the determining device in this preferred embodiment can also include: an adjusting unit 506 which is connected with the determining unit 504, and is configured to adjust the parameters which are used for affecting the cell coverage in the cell which has coverage holes, after it is determined that the RLF reason is that a coverage hole exists in the cell. In this preferred embodiment, the network can be optimized by adjusting the parameters of the cell which is abnormal.

Preferably, the adjusting unit 506 adjusts the parameters which are used for affecting the cell coverage in the cell which has the coverage holes via the following steps: generating the optimization parameters according to the determined cell which has the coverage holes and the size and location of the coverage holes; and adjusting the parameters which are used for affecting the cell coverage in the cell which has the coverage holes by using the optimization parameters. For example, after the source eNB determines the cell which has the coverage problem, the network optimization can be achieved by adjusting the parameters which affect the cell coverage, such as the transmitting power, antenna tilt and the like of the cell which has the coverage problem.

Preferably, the ambient signal quality information includes at least one of: the service signal quality of the serving cell and the neighbor cell measured when the UE initiates the RRC request to the second eNB.

Preferably, the above location information can be represented by longitude, latitude and elevation and the like.

Preferably, the first eNB and the second eNB are located in different systems. That is, if the UE establishes the RRC connection in a different system, such as the UTRAN or GSM system, the determining methods mentioned in each embodiment of the disclosure can also be applied.

Preferably, the information reported by the UE also can be transferred among the eNBs via the interface, such as the X2 interface or the S1 interface in the LTE system.

It should note that the steps shown in the flowchart of the drawings can be executed in the computer systems of which the indications can be executed by a set of computers. In addition, although the flowchart shows the logic sequence, the shown or described steps also can be executed according to different sequences in some cases.

Obviously, those skilled in the art should understand that each of the mentioned modules or steps of the disclosure can be realized by universal computing devices. The modules or steps can be focused on single computing device, or distributed on the network formed by multiple computing devices. Optionally, they can be realized by the program codes which can be executed by the computing device. Thereby, the modules or steps can be stored in the storage device and executed by the computing device. Under some circumstances, the shown or described steps can be executed in different orders, or can be independently manufactured as each integrated circuit module, or multiple modules or steps thereof can be manufactured to be single integrated circuit module, so as to be realized. Thus, the disclosure is not limited by any combination of the specific hardware and software.

The above are only the preferred embodiments of the disclosure and are not intended to limit the disclosure. For those skilled in the art, the disclosure can have various improvements and modifications. And any modifications, equivalent replacements, improvements and the like within the principle of the disclosure shall fall within the scope of protection of the disclosure.

INDUSTRIAL APPLICABILITY

The disclosure is suitable for the field of wireless mobile communication, and is applied to determining the RLF reason. The main purpose of the disclosure is to solve the problem that the network side cannot accurately judge the RLF reason. Via the disclosure, the RLF reason can be judged by using the ambient signal quality information and the location information, thus enabling the network side to obtain more accurate and comprehensive information.

What is claimed is:

1. A method for determining a Radio Link Failure (RLF) reason, wherein an RLF occurs to a User Equipment (UE) located in a first Evolved Node B (eNB), the UE successfully establishes a Radio Resource Connection (RRC) with a second eNB, and the method comprises:

the UE sending RLF information to the first eNB, wherein the RLF information comprises at least one of: ambient signal quality information recorded by the UE when the RRC is established successfully, location information of the UE when the RLF occurs, and location information of the UE when the RRC is successfully established; wherein the RLF information is used for identifying the issue of coverage holes when the RLF occurs, the location information of the UE when the RLF occurs or the RRC is successfully established is represented by longitude, latitude and elevation; and the first eNB determining the RLF reason according to the RLF information;

wherein the UE sending the RLF information to the first eNB comprises: the UE reporting the RLF information to the second eNB; and the second eNB sending the RLF information to the first eNB via an X2 interface; or the UE reporting the RLF information to the second eNB; the second eNB sending the RLF information to a core network via an S1 interface; and the core network sending the RLF information to the first eNB via an S1 interface;

wherein the first eNB determining the RLF reason according to the RLF information comprises:

the first eNB judging whether signal quality of a cell, which is recorded when the RLF occurs and is carried in the RLF information, is less than a preset threshold, wherein the cell comprises at least one of: a serving cell where the UE is located and neighbor cells; and if the signal quality is less than the preset threshold, the first eNB determining that the RLF reason is that the coverage hole exists in the cell;

wherein the first eNB supports the following function: after determining that the RLF reason is that the coverage hole exists in the cell, adjusting parameters which are used for affecting cell coverage in the cell which has the coverage hole;

wherein the first eNB judging whether the signal quality of the serving cell or the neighbor cells, which is recorded when the RLF occurs and is carried in the RLF information, is less than the preset threshold further comprises: determining that the RLF reason is that the coverage hole exists in the cell, if the cell of which the signal quality is less than the preset threshold exists; and calculating size and location of the coverage hole in the cell of which the signal quality is less than the preset threshold, according to a cell coverage model, a signal attenuation model, the location information of the UE when the RLF occurs, and the location information of the UE when the RRC is established successfully.

2. The method according to claim 1, wherein the ambient signal quality information comprises at least one of: service signal quality of a serving cell and neighbor cells which is measured when the UE initiates an RRC request to the second eNB.

3. The method according to claim 1, wherein the first eNB and the second eNB are located in different systems.

4. A method for determining a Radio Link Failure (RLF) reason, wherein an RLF occurs to a User Equipment (UE) located in a first Evolved Node B (eNB), the UE successfully establishes a Radio Resource Connection (RRC) with a second eNB, and the method comprises:

the first eNB receiving RLF information from the UE, wherein the RLF information comprises at least one of: ambient signal quality information recorded by the UE when the RRC is established successfully, location information of the UE when the RLF occurs, and location information of the UE when the RRC is successfully established; wherein the RLF information is used for identifying the issue of coverage holes when the RLF occurs, the location information of the UE when the RLF occurs or the RRC is successfully established is represented by longitude, latitude and elevation; and the first eNB determining the RLF reason according to the RLF information;

wherein the first eNB receiving RLF information from the UE comprises:

the UE reporting the RLF information to the second eNB; and the first eNB receiving the RLF information from the second eNB via an X2 interface; or the UE reporting the RLF information to the second eNB; the second eNB sending the RLF information to a core network via an S1 interface; and the first eNB receiving the RLF information from the core network via an S1 interface;

wherein the first eNB determining the RLF reason according to the RLF information comprises: the first eNB judging whether signal quality of a cell, which is recorded when the RLF occurs and is carried in the RLF information, is less than a preset threshold, wherein the cell comprises at least one of: a serving cell where the UE is located and neighbor cells; and if the signal quality is less than the preset threshold, the first eNB determining that the RLF reason is that a coverage hole exists in the cell;

wherein the first eNB supports the following function: after determining that the RLF reason is that the coverage hole exists in the cell, adjusting parameters which are used for affecting cell coverage in the cell which has the coverage hole;

wherein the first eNB judging whether the signal quality of the serving cell or the neighbor cells, which is recorded when the RLF occurs and is carried in the RLF information, is less than the preset threshold further comprises: determining that the RLF reason is that the coverage hole exists in the cell, if the cell of which the signal quality is less than the preset threshold exists; and calculating size and location of the coverage hole in the cell of which the signal quality is less than the preset threshold, according to a cell coverage model, a signal attenuation model, the location information of the UE when the RLF occurs, and the location information of the UE when the RRC is established successfully.

5. The method according to claim 4, wherein the ambient signal quality information comprises at least one of: service signal quality of a serving cell and neighbor cells which is measured when the UE initiates an RRC request to the second eNB.

6. The method according to claim 5, wherein the first eNB and the second eNB are located in different systems.

* * * * *